(12) United States Patent
Dedhia et al.

(10) Patent No.: US 7,945,554 B2
(45) Date of Patent: May 17, 2011

(54) SYSTEMS AND METHODS FOR PROVIDING ENHANCED JOB SEARCHING

(75) Inventors: Harshal D. Dedhia, Santa Clara, CA (US); Adam Hyder, Los Altos, CA (US); Geoffrey Vincent Perez, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 715 days.

(21) Appl. No.: 11/609,287

(22) Filed: Dec. 11, 2006

(65) Prior Publication Data

US 2008/0140710 A1  Jun. 12, 2008

(51) Int. Cl.
 *G06F 17/30* (2006.01)
(52) U.S. Cl. ........ 707/710; 707/722; 707/736; 707/755; 707/811; 707/947
(58) Field of Classification Search .................. 705/8, 9, 705/1.1, 14.69, 39, 320, 321; 707/1, 6, 10, 707/999.107, 999.1, 999.101, 710, 722, 736, 707/755, 811, 947
See application file for complete search history.

(56) References Cited

U.S. PATENT DOCUMENTS

| | | | | |
|---|---|---|---|---|
| 7,191,176 B2 * | 3/2007 | McCall et al. | | 707/6 |
| 7,424,438 B2 * | 9/2008 | Vianello | | 705/9 |
| 7,505,919 B2 * | 3/2009 | Richardson | | 705/8 |
| 7,519,594 B2 * | 4/2009 | McCall et al. | | 707/6 |
| 7,680,855 B2 * | 3/2010 | Hyder et al. | | 707/710 |
| 7,702,674 B2 * | 4/2010 | Hyder et al. | | 707/710 |
| 7,707,203 B2 * | 4/2010 | Hyder et al. | | 707/710 |
| 7,711,573 B1 * | 5/2010 | Obeid | | 705/1.1 |
| 7,865,451 B2 * | 1/2011 | Hyder et al. | | 705/321 |
| 2001/0049674 A1 * | 12/2001 | Talib et al. | | 707/1 |
| 2002/0059228 A1 * | 5/2002 | McCall et al. | | 707/6 |
| 2002/0072946 A1 * | 6/2002 | Richardson | | 705/8 |
| 2006/0206505 A1 * | 9/2006 | Hyder et al. | | 707/100 |
| 2006/0212466 A1 * | 9/2006 | Hyder et al. | | 707/101 |
| 2006/0229899 A1 * | 10/2006 | Hyder et al. | | 705/1 |
| 2008/0133343 A1 * | 6/2008 | Hyder et al. | | 705/14 |
| 2008/0133499 A1 * | 6/2008 | Hyder et al. | | 707/5 |
| 2008/0133595 A1 * | 6/2008 | Hyder et al. | | 707/104.1 |
| 2008/0140680 A1 * | 6/2008 | Hyder et al. | | 707/100 |

* cited by examiner

*Primary Examiner* — Jean M Corrielus
(74) *Attorney, Agent, or Firm* — James J. DeCarlo; Greenberg Traurig, LLP (57) ABSTRACT

Methods and systems of providing a job search to a jobseeker are disclosed. Based on previously stored user preferences, job listings can be presented to users. User preferences can be gathered through previous search requests, resume keywords, jobseeker applies to job listings, jobseekers viewing job listings, etc. The search request can include search criteria. As such, preference data related to the jobseeker is identified based on jobseeker online behavior. In one embodiment, a set of jobs listings having associated metadata that match the search criteria is identified. A subset of job listings that match the preference data is identified. The subset of job listings is a subset of the set of job listings. At least the subset of job listings can be provided to the jobseeker. In another embodiment, a set of job listings having associated metadata that match the search criteria and the jobseeker preferences is identified and provided to the jobseeker.

25 Claims, 11 Drawing Sheets

| Jobseeker Profile | |
|---|---|
| Attribute | Value |
| First Name | Joe |
| Last Name | Morrison |
| Address | 123 Development Rd. |
| Previous Employer | Great Software, Inc |
| Job Category | Sales |
| Company Sector | Finance |
| Company Size | 15,000 |
| Other attributes | Other values |

SYSTEMS AND METHODS FOR PROVIDING ENHANCED JOB SEARCHING

BACKGROUND

1. Field

The present disclosure relates to job listing services. In particular, it relates to systems and methods of providing an enhanced job search for jobseekers that access online listing service providers.

2. General Background

Job listing providers generally provide searchable databanks of job listings related to employment opportunities and openings. In the current generation of online job listing services, listing service providers provide job searching capabilities to jobseekers based on search keywords entered by the jobseeker. Typically, search results include job listings that have description information that matches the search keywords. Search results often include job listings that may not be relevant to the jobseeker. Furthermore, relevant job listings may appear at the bottom of the search result list, or worse, on the next page displayed which requires the jobseeker to follow a website link to another webpage. As a result, jobseekers may receive irrelevant job listings while missing job listings that could be more relevant.

SUMMARY

Method and systems of providing a job search to a jobseeker are disclosed. Based on previously stored user preferences, job listings can be presented to users. User preferences can be gathered through previous search requests, resume keywords, jobseeker applies to job listings, jobseekers viewing job listings, etc. The search request can include search criteria. As such, preference data related to the jobseeker is identified based on jobseeker online behavior. In one embodiment, a set of jobs listings having associated metadata that match the search criteria is identified. A subset of job listings that match the preference data is identified. The subset of job listings is a subset of the set of job listings. At least the subset of job listings can be provided to the jobseeker.

In one aspect, preference data is stored as keywords, or as scores for multiple categories. In another aspect, preference data is stored as in a jobseeker profile, or in a cookie implanted on a jobseeker computing device.

In another aspect, preference data can be determined from explicit jobseeker input. In yet another aspect, preference data can be determined from implicit jobseeker input.

In one aspect, there is a method of providing a job search to a jobseeker. A search request that includes search criteria is received from a jobseeker. A set of jobs listings having associated metadata that matches the search criteria is identified. Implicit preferences of the jobseeker are identified based on keywords in a previously submitted search by the jobseeker. A subset of job listings that match the preference data is identified from the set of job listings. The subset of job listings is provided to the jobseeker.

In one aspect, there is a system of providing a job search to a jobseeker. The system comprises a search engine, a preference data collection module, and a relevance engine. The search engine receives from a jobseeker a search request that includes search criteria. The search engine identifying a set of jobs listings that have associated metadata that matches the search criteria. The preference data collection module identifies implicit preferences of the jobseeker based on keywords in a previously submitted search by the jobseeker. The relevance engine identifies, from the set of job listings, a subset of job listings that match the preference data, the subset of job listings being provided to the jobseeker.

In one aspect, there is a method of providing a job search to a jobseeker. An expression of interest in a job listing is received from a jobseeker. Jobseeker preferences in a jobseeker profile are updated to include metadata associated with the job listing. A search request that includes search criteria is received from the jobseeker. A set of jobs listings having associated metadata that matches the search criteria and the preference data is identified. At least the set of job listings is provided to the jobseeker.

In a further aspect, an expression of interest in a job listing comprises an input indicating that the jobseeker wishes to apply for the job listing. In another aspect, an expression of interest in a job listing comprises an input indicative that the jobseeker wants to view the job listing. In another aspect, an expression of interest in a job listing comprises an input indicative of a previous employment position held by the jobseeker that is similar to the job listing.

In yet another aspect, the metadata associated with the job listing includes profile of the recruiter that posted the job listing.

In one aspect, there is system of providing a job search to a jobseeker that comprises a preference data collection module, and a search engine. The preference data collection module receives from a jobseeker an expression of interest in a job listing. The preference data collection module can be configured to update jobseeker preferences in a jobseeker profile to include metadata associated with the job listing. The search engine receives from the jobseeker a search request that includes search criteria. The search engine identifies a set of jobs listings having associated metadata that matches the search criteria and the preference data. The search engine can be configured to provide at least the set of jobs listings to the jobseeker.

DRAWINGS

The features and objects of alternate embodiments of the present disclosure will become more apparent with reference to the following description taken in conjunction with the accompanying drawings of various examples wherein like reference numerals denote like elements and in which.

DETAILED DESCRIPTION

The system and method disclosed herein permits a jobseeker to receive a refined and relevant list of job listings when searching for jobs. Based on jobseeker preferences, job listings can be filtered and reorder so as to present to the jobseeker job listings that are more relevant to the jobseeker. In addition to utilizing search words provided by the jobseeker, the systems and methods disclosed herein, further utilize implicit and explicit data provided by the jobseeker during previous online interactions. Such implicit and explicit data can be translated into patterns of preference that are used to further filtrate job listings that are relevant to the user. As such, preference data can be stored as scores, words, etc. In addition, such preference data can be stored as user profiles for subscribed jobseekers, implanted cookies, etc.

Figure 1:
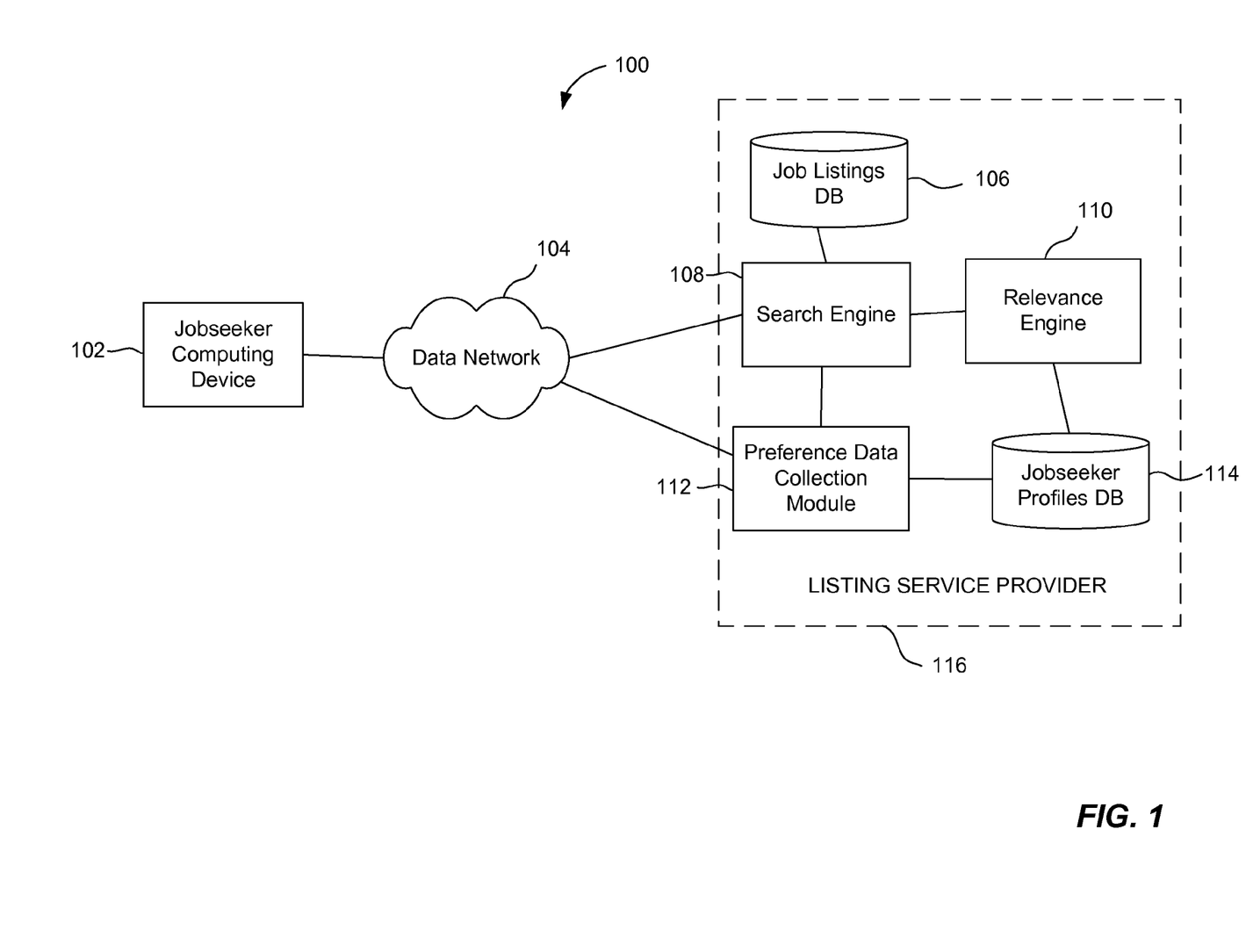
FIG. 1 depicts a component diagram of a system for providing an enhanced job searching.

FIG. 1 depicts a component diagram of a system for providing an enhanced job searching according to one embodiment. Enhanced job searching can be provided by a listing service provider 116. In one embodiment, the listing service provider 116 can host an online service of listing, posting and searching jobs. As such the listing service provider 116 can be a business entity that owns and operates a computer infrastructure connected to a data network in order to provide a job listing service.

Jobseekers can access the services provided by the listing service provider 116 via a data network 104. In one embodiment, the data network is the Internet. The jobseeker can utilize a jobseeker computing device 102 to communicate via the data network 104 with one or more computing modules and or services that are part of the computer infrastructure managed by the listing service provider 116.

In one embodiment, a preference data collection module 112 can be included as part of the computer infrastructure operated by the listing service provider 116. The preference data collection module 112 can be configured to extract jobseeker preferences and interests based on jobseeker activity when interacting with the listing service provider 116. As such, the preference data collection module 112 can be configured to extract or determine preference information of a jobseeker from resumes that the jobseeker has uploaded and transmitted to the listing service provider 116. In another embodiment, the preference data collection module 112 can be configured to determine jobseeker preferences based on previous searches for jobs that the jobseeker has submitted. In another embodiment, the preference data collection module 112 can be configured to determine jobseeker preferences based on web searching or web surfing activities of the jobseeker. In yet another embodiment, the preference data collection module 112 can be configured to receive from the jobseeker an expression of interest in a job listing, and determined preference data based on such expression of interest. For example, the jobseeker's expression of interest can be an input indicating that the jobseeker wishes to apply for the job listing. In another example, the jobseeker's expression of interest can be an input indicating that the jobseeker wishes to view the job listing. In another embodiment, the preference data collection module 112 can be configured to determine jobseeker preferences based on previous employment of the jobseeker.

As such a jobseeker that submits a job search query to the listing service provider 116 can receive job search results that are more relevant to the jobseeker based on previous jobseeker interactions with the listing service provider 116 or online behavior in general.

Once the data related to jobseeker preferences is collected, the collected data can be stored in association to the jobseeker. In one embodiment, jobseeker preferences can be stored in a jobseeker's profile in a jobseeker profile's database 114. In another embodiment, jobseekers preferences can be stored in a jobseeker computing device 102. For example, the jobseeker's preferences can be stored in the form of one or more cookies.

Jobseeker queries can be received at a search engine 108. In one embodiment, the search engine 108 is configured with logic to determine whether the search words submitted by the jobseeker match any job listing descriptions as stored in the job listings database 106. For example, job listings can have metadata such as job title, location, surrounding areas, salary, associated keywords, employer name, identifiers, job affinity information, etc. The search engine 108 can be configured to compare each of these pieces of data against search words used by the jobseeker.

Furthermore, the search engine 108 can interact with the relevance engine 110 to further refine the search results obtained from matching the search words submitted by the jobseeker against existing job listing data. In order to further refine the search results, the relevance engine 110 can utilize jobseeker preferences gathered by the preference collection module. In one embodiment, the relevance engine 110 can be configured to retrieve preference data from the jobseeker profiles database 114. Preference data in the jobseeker profile can be either implicit or explicit. In another embodiment, the relevance engine 110 can be configured to obtain a cookie or other stored information in the computing device 102. In yet another embodiment, the relevance engine 110 can be configured to query any other data repository that stores data associated with jobseeker preference.

For example, if the jobseeker submits a query for a job that is titled "Software Engineer," the search engine 108 can query the job listing database 106 for any and all job listings that have metadata that includes the term "Software Engineer." Once a set of job listings has been determined by the search engine 108, the relevance engine 110 can refine the set of job listing produced by search engine 108 based on the jobseeker's profile. For instance, the jobseeker profile can include a term ".Net" that refers to a specific programming skill listed in the jobseeker's resume. Based on the term ".Net" stored in the jobseeker's profile, the relevance engine 110 can refine the set job listings that are presented to the jobseeker. In one embodiment, refining the set of job listings comprises reordering the set of job listings so as to prioritize and place towards the top of the list those job listings that are more relevant.

In another embodiment, refining the set of job listings comprises removing from the set of jobs listings those job listings that are not relevant to the jobseeker based on the jobseeker preferences. For example, if the jobseeker preferences include categories of Technology, Engineering, and Telecommunications, any other job listings that do not fall under those categories can be removed. Accordingly, the jobseeker who initially only submitted a search for "Software Engineer" can receive more relevant results based on jobseeker preferences that had been saved in association with the jobseeker.

In another embodiment, the search engine 108 does not interact with the relevance engine 110. As such, the search engine 108 can be configured to search for a job listing utilizing the search queries entered by the jobseeker as well as preferences in the jobseekers profile. Thus, the search engine 108 can access the jobseekers profiles database 114 in order to retrieve jobseeker profile data indicative of jobseeker preferences. In addition, the search engine 108 can be configured to restructure or reword the search query such that keywords obtained from the jobseekers profile can be utilized as part of the search query. Using the combination of the keyword search of the user and keywords or other data stored in the jobseekers profile, the reworded query can yield more relevant job listings.

Figure 2:
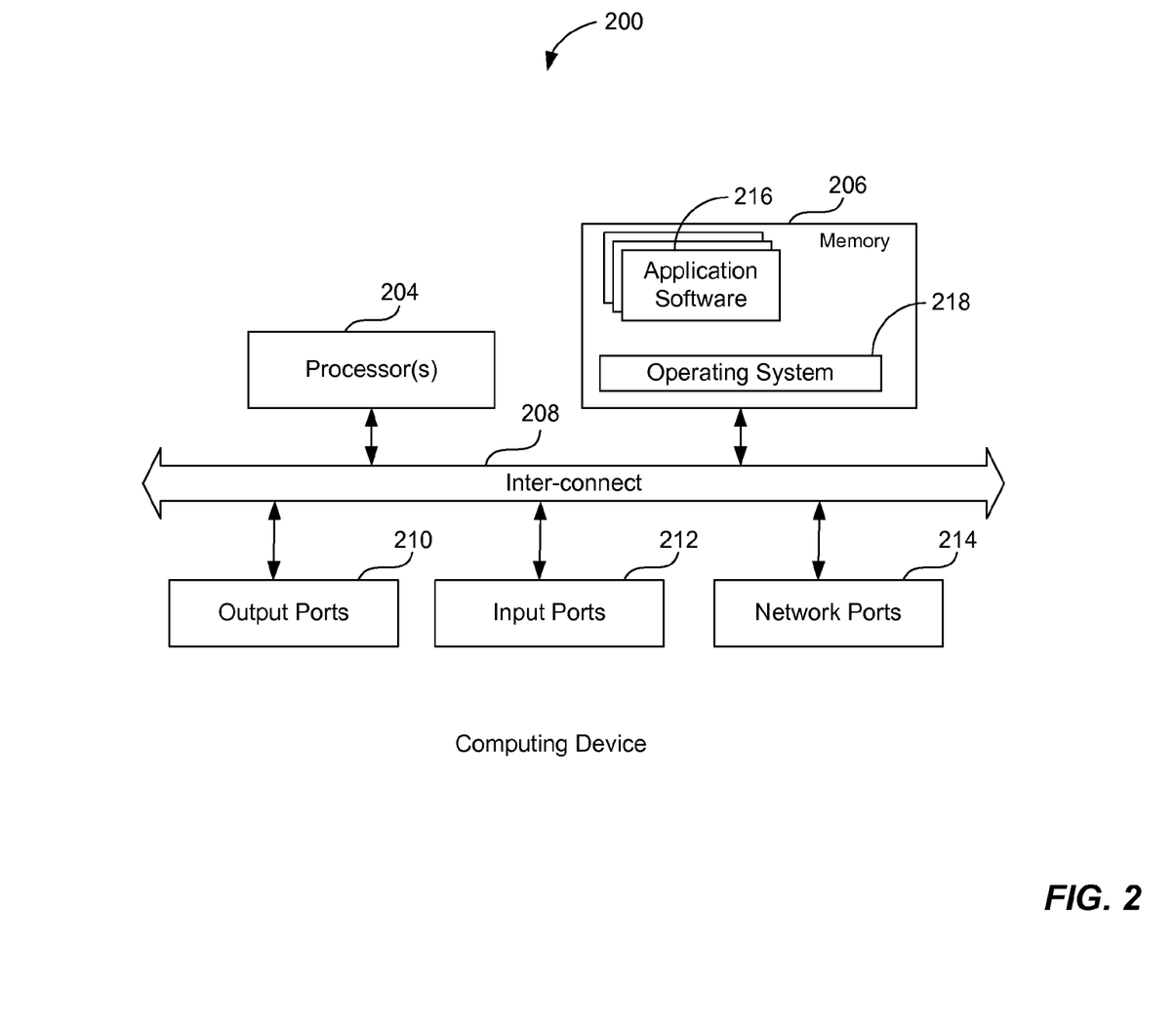
FIG. 2 depicts a component diagram of a computing device according to one embodiment.

FIG. 2 depicts a component diagram of a computing device according to one embodiment. The computing device 200 can be utilized to implement one or more computing devices, computer processes, or software modules described herein. In one example, the computing device 200 can be utilized to process calculations, execute instructions, receive and transmit digital signals, as required by the jobseeker computing device 102. In another example, the computing device 200 can be utilized to process calculations, execute instructions, receive and transmit digital signals, receive and transmit search queries, job listings, hypertext, as required by the relevance engine 110, the search engine 108, and the preference collection module 112.

The computing device 200 can be any general or special purpose computer now known or to become known capable of performing the steps and/or performing the functions described herein, either in software, hardware, firmware, or a combination thereof.

The computing device 200 includes an inter-connect 208 (e.g., bus and system core logic), which interconnects a microprocessor(s) 204 and memory 206. The inter-connect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices. In addition, the output port 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The inter-connect 208 can also include a network connection 214.

The memory 206 may include ROM (Read Only Memory), and volatile RAM (Random Access Memory) and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Figure 3:
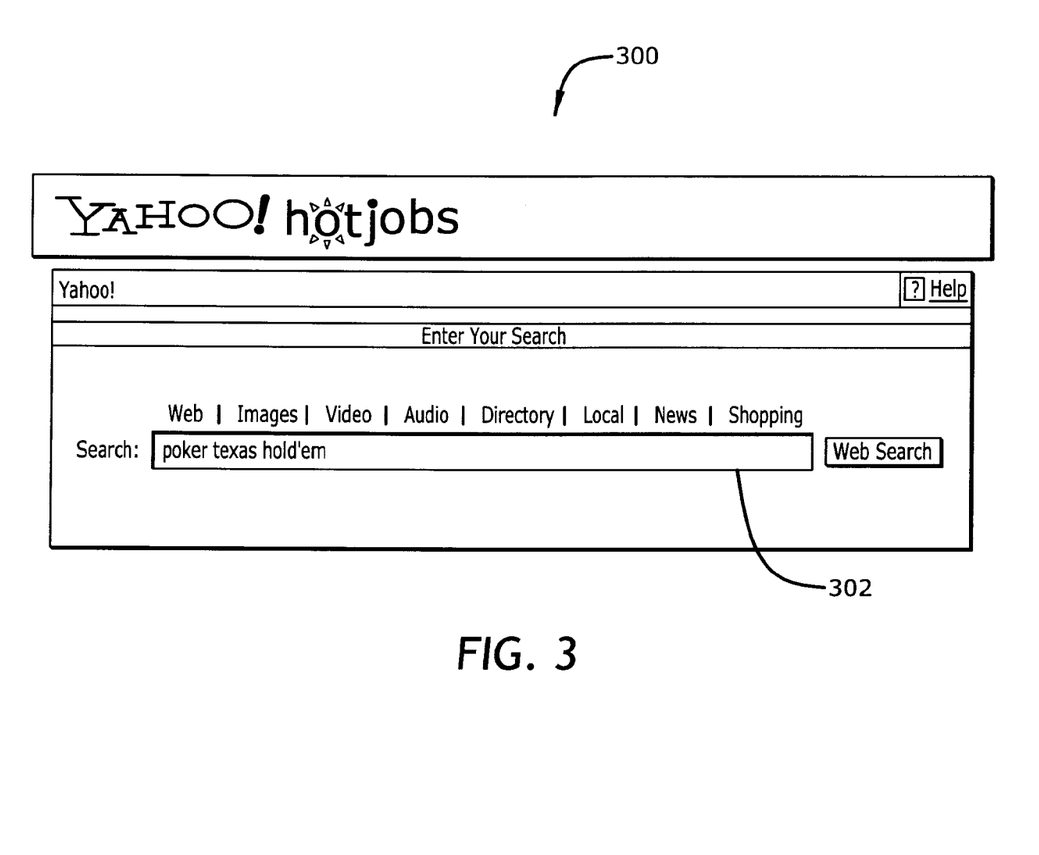
FIG. 3 depicts an exemplary user interface for uploading a resume according to one embodiment.

FIG. 3 depicts an exemplary user interface for entering a web search request according to one embodiment. In one aspect, the listing service provider 116 can include a web search engine (not shown) that can be utilized by a jobseeker to search the World Wide Web. The jobseeker can enter search requests in the search field 302. In another example, the search requests can be received by the search engine 108 which can be further configured to handle web searching. In another example, the search request can be limited to a job listing vertical provided by the listing service provider 114.

As the jobseeker enters search words in the web search engine, jobseeker preferences can be established based on jobseeker queries. As such, search words utilized by the jobseeker in web searching, and in online behavior in general, can be utilized to infer jobseeker preferences. As an example, if the jobseeker enters the words "poker" and "texas hold'em" in the search field 302, the jobseeker can be deemed to have a preference, or at least an interest, in card games, poker, etc. As the jobseeker continues to use similar words in searching the World Wide Web, and visiting websites, jobseeker preferences may become clearer. Thus, for example, if the user visits poker game websites, or continues to enter terms similar to "poker," a score can be kept that increases as the frequency of usage of the term "poker" increases, or access to card game websites continues. In this example, the jobseeker can be deemed to be interested in items that relate to card games such as poker. As such, the data collection in module 112 can store in the jobseeker's profile's database 114 an indication that the jobseeker is interested in poker card games, chance games or any other type of game that can be deemed related to poker.

In one embodiment, the preference data collection module 112 can be configured to analyze the search words provided by the jobseeker in order to determine implicit jobseeker preferences. In another embodiment, the preference data collection module 112 can be configured to analyze websites visited by the jobseeker in order to determine explicit jobseeker preferences.

In another embodiment, the preference data collection module 112 can be selective about the search words that are used to derive jobseeker preferences. For example, the preference data collection module 112 can further be configured with a table of employment-related terms, such that when a jobseeker enters those terms as part of the general search, the terms are included as part of the jobseeker profile.

Figure 4:
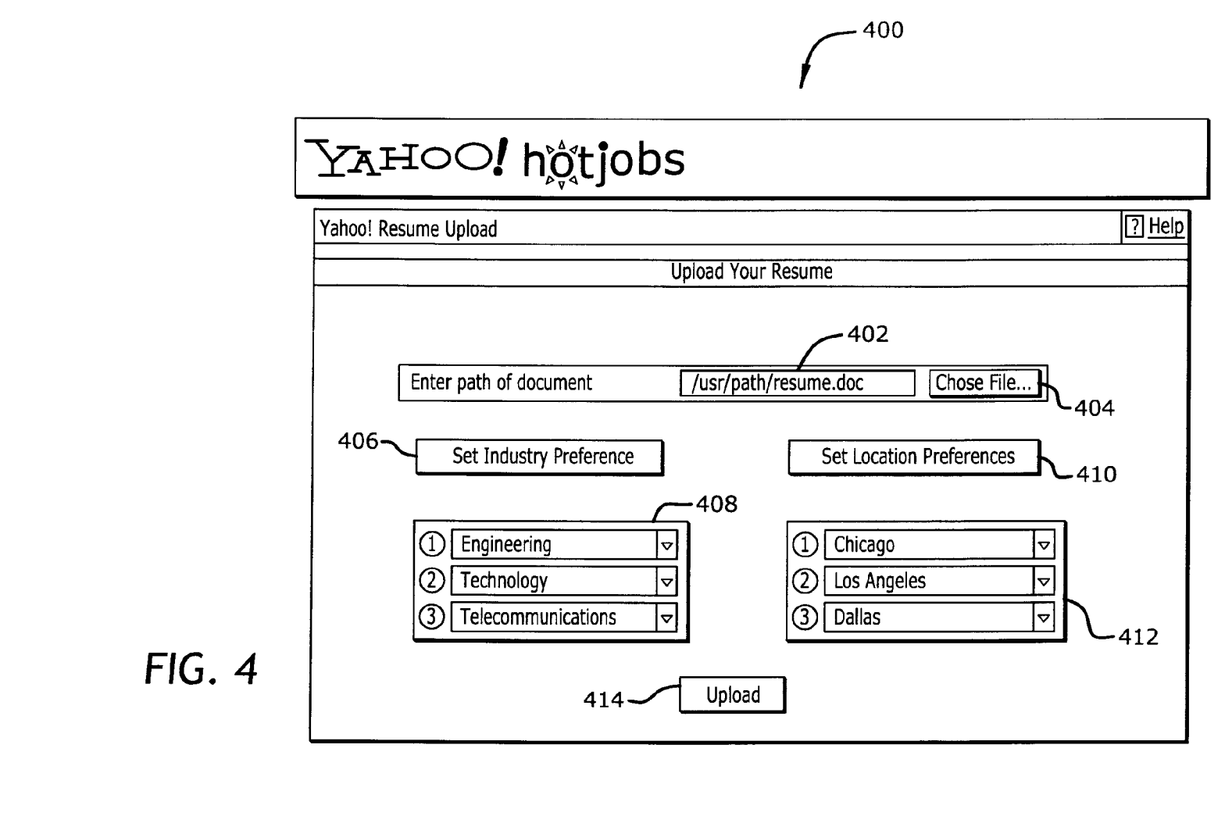
FIG. 4 depicts an exemplary user interface for entering a web search request according to one embodiment.

FIG. 4 depicts an exemplary user interface user interface for uploading a resume according to one embodiment. User interface 400 can include a text field 402 for entering a file path. A jobseeker can enter the file path of the location of a digital document that corresponds to the jobseeker's resume in the text field 402. In one example, the jobseeker can choose the file path by selecting for example a button 404 to browse the contents of one or more data storage devices associated with the jobseeker computing device 102.

Once the file path of the resume is entered by the jobseeker, the jobseeker can explicitly indicate jobseeker's preferences. For example, the jobseeker can enter an industry preference using one or more dropdown menus 408. The jobseeker can indicate that the first preference for an industry that the jobseeker would like to work in is "Engineering." As a second level preference the jobseeker can select "Technology." In addition, as the third industry the jobseeker can select "Telecommunications" as the third industry of preference. In one example, these preferred industries can be saved as part of the jobseeker profile. In another example, these preferred industries can be saved on the jobseeker computing device 102.

In one embodiment, jobseeker explicit selections utilizing for example weights or scores that would indicate the jobseeker preferences for these industries and the corresponding scores. As such, when the jobseeker later searches for job listings, the relevance engine 110 can utilize the industry scores to further refine the job listing that would be more appropriate and relevant to the jobseeker. In another example, the jobseeker can enter location preferences. For example, the jobseeker can enter location preferences in a set of drop down boxes 412.

Upon receiving the uploading of a resume, the preference data collection module 112 can be configured to parse the text in the resume. The text in the resume can further be utilized by the preference data collection module 112 in order to establish implicit preferences by the user.

As such, the preference data collection module 112 can identify words or areas of interest based on the submitted resume of the jobseeker. Therefore, specific skills, industries, locations, prior employers, education, etc., can be identified in relation to a jobseeker. For example, the preference data collection module 112 can be configured to recognize text that corresponds to a geographical location such as cities and states that are included in the resume. In addition, the preference data collection module 112 can be configured to provide a higher weight to those geographical locations that appear with higher frequency in the jobseeker's resume. Then, based on the frequency of appearance in the resume, geographical locations can be implicitly included in the jobseeker's profile as being preferences of the jobseeker. As mentioned before, such preferences can that can later be used for refining and providing a more relevant search result when a jobseeker submits a job search.

In addition other user interfaces can also be provided to the jobseeker such that the jobseeker can enter explicit preferences later utilized to further refine a job search submitted by a jobseeker.

Figure 5:
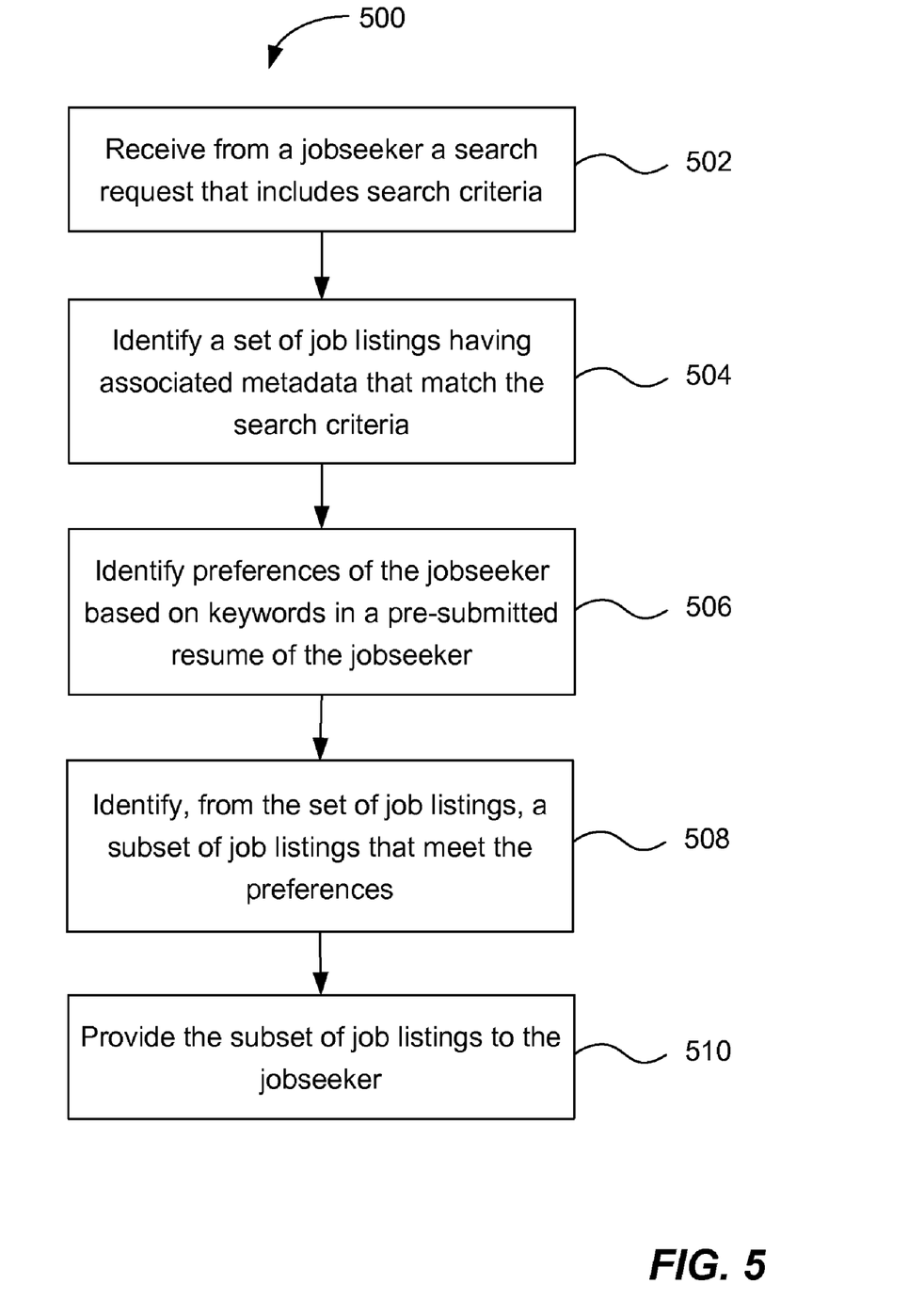
FIG. 5 depicts a flow diagram of a process for providing an enhanced job searching utilizing implicit jobseeker preferences identified in a jobseeker resume.

FIG. 5 depicts a flow diagram of a process for providing an enhanced job searching utilizing jobseeker preferences identified in a jobseeker resume according to one embodiment. At process block 502, a search request including search criteria is received from a jobseeker. In one embodiment, the search criteria include job title keywords. In another embodiment, the search criteria include location and job title. In yet another embodiment, the search criteria include job title and industry. Process 500 continues at process block 504.

At process block 504 a set of job listings having associated metadata that matches the search criteria is identified. The set of job listings for example can include jobs that have location and job titles that match the location or job titles that the jobseeker entered as part of the search criteria. Process 500 continues at process block 506.

At process block 506 jobseeker preferences are identified based on keywords of a previously submitted resume by the jobseeker. Preferences of the jobseeker can be identified either via implicit or explicit indication by the jobseeker. For example, an explicit indication by the jobseeker can include job titles or locations that the jobseeker has explicitly indicated to prefer. In another example, implicit indications of preference can include keywords found in the jobseeker's resume that the preference data collection module 112 has analyzed and determined to be implicitly preferred by the jobseeker. Process 500 continues at process block 508.

At process block 508, a subset of job listings that further meet the preferences of the jobseeker is identified from the set of job listings. The preferences of the jobseeker can be, for example, obtained from the jobseeker's profile that includes one or more entries corresponding to implicit or explicit preferences that the jobseeker has provided during his interaction with the listing service provider 116. Process 500 continues at process block 510.

At process block 510, the subset of job listings previously identified is provided to the jobseeker. In one embodiment, the subset of job listings is provided in a website. In one embodiment, in addition to the subset of job listings, jobs listings that are part of the set of job listings and not part of the subset of job listings can also be provided to the jobseeker.

Figure 6:
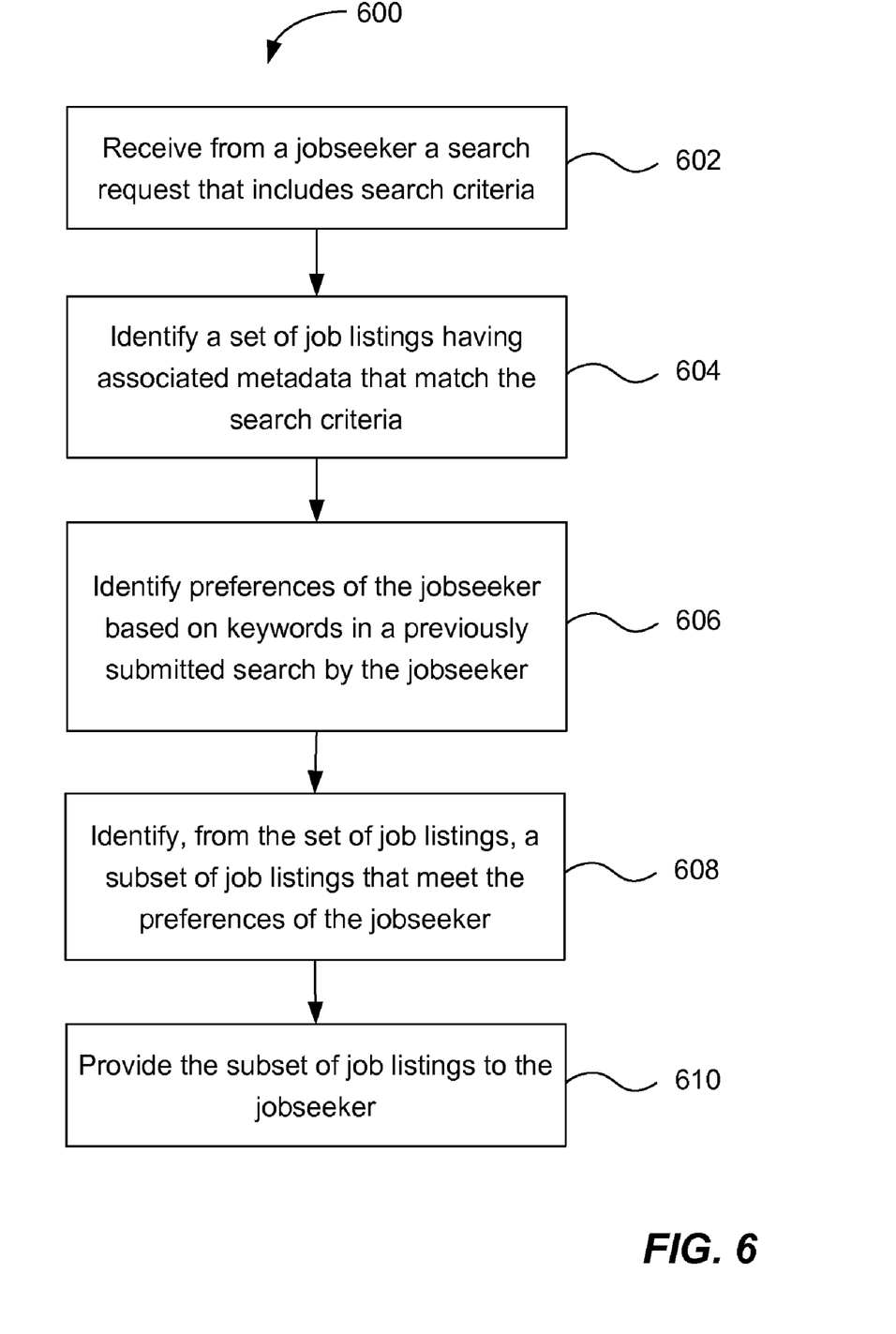
FIG. 6 depicts a flow diagram of a process for providing an enhanced job searching utilizing implicit jobseeker preferences identified from a jobseeker search.

FIG. 6 depicts a flow diagram of a process for providing an enhanced job searching utilizing jobseeker preferences identified from a jobseeker search according to one embodiment. At process block 602 a search request is received from a jobseeker. The search request can include search criteria for job location, job title, job industry, job salary, and other jobseeker requirements. Process 600 continues at process block 604.

At process block 604 a set of job listings having metadata that matches the search criteria entered by the jobseeker is identified. Again, this set of job listings correspond to job listings that have been retrieved from the job listing database 106 that include metadata corresponding to jobs that are relevant to the search provided by the jobseeker. Process 600 continues at process block 604.

At process block 606, preferences of the jobseeker are identified based on keywords that have been previously submitted by the jobseeker. In one embodiment, keywords submitted by the jobseeker can include keywords that were entered during a search. In one example, the search can be for a web search on the World Wide Web. As such, the job listings provider 116 can either be communicated through the data network 104 with an external search engine that feeds the jobseekers input, or the job listing service provider 116 provides a web search engine that is part of the listing service provider's infrastructure. In another example, the search can be a search for job listings.

Based on keywords submitted by the search of the jobseeker, the preference data collection module 112 can analyze the keywords and determine implicit preferences provided by the jobseeker. Implicit preferences provided by the jobseeker can be for example stored at the jobseeker profile. In another embodiment, the jobseeker preferences can be stored on the jobseeker's computers such as the jobseeker computing device 102. Thus, as the jobseeker computing device 102 continues to search on different web search engines mechanisms such as cookies or other implanted data can be stored on the jobseeker's computing device 102. Such stored data can be utilized later by the search engine 108 and the relevance engine 110. Process block 600 continues at process block 608.

At process block 608 a set of job listings is further searched and refined to identify a subset of job listings that meet the preferences of the jobseeker. Therefore, in one embodiment the subset can be a smaller or shorter list of job listings that only need the preferences of the jobseeker. Process 600 continues at process block 610.

At process block 610, the subset of job listings is provided to the jobseeker. Therefore, the subset of job listings can include metadata that matches no only the search criteria provided by that jobseeker, but also preferences implicitly and explicitly provided by the jobseeker in interactions with the job listings service provider 116.

Figure 7:
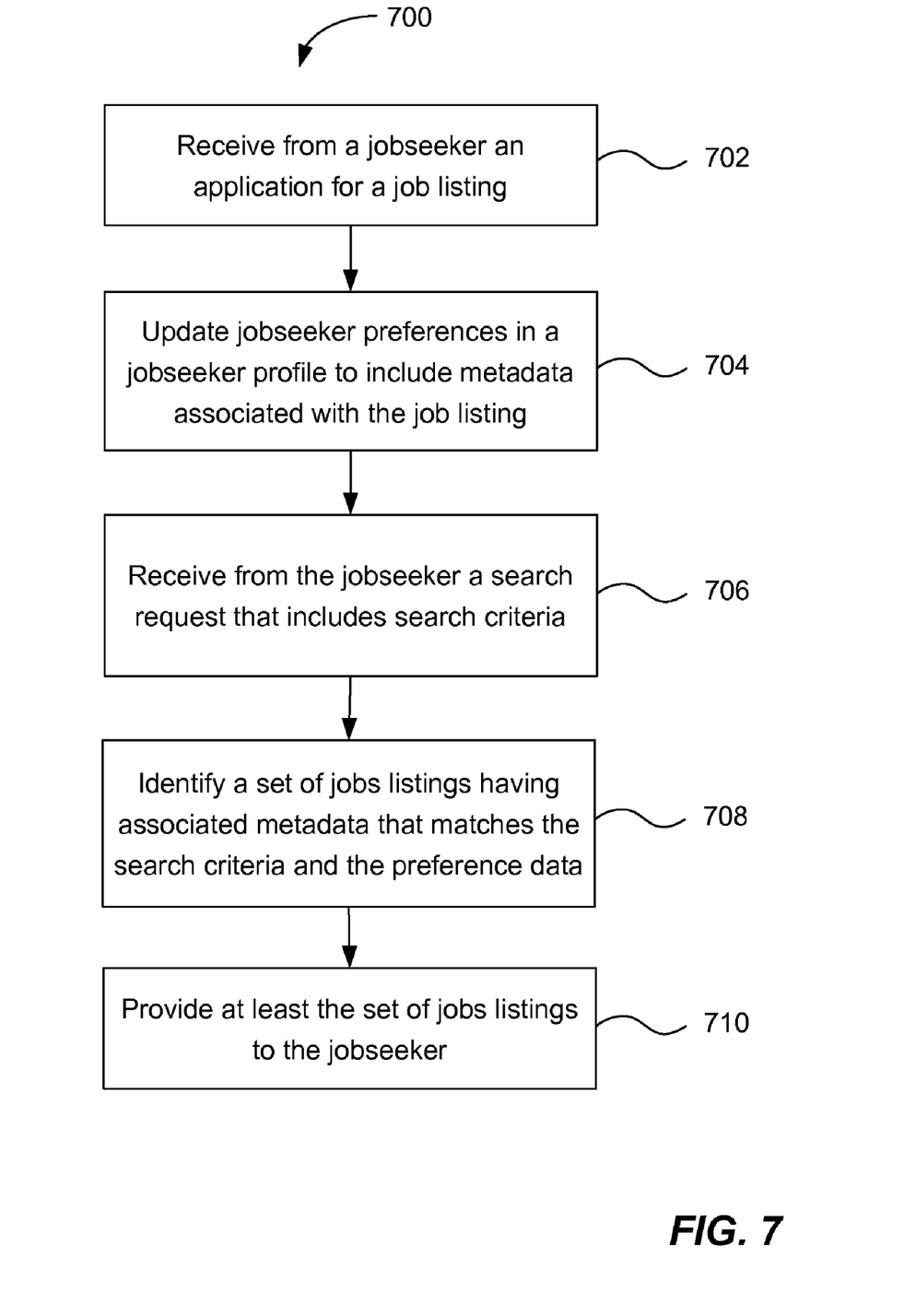
FIG. 7 depicts a flow diagram of a process for providing an enhanced job searching utilizing implicit jobseeker preferences identified from a jobseeker expression of interest in a job listing according to one embodiment.

FIG. 7 depicts a flow diagram of a process for providing an enhanced job searching utilizing implicit jobseeker preferences identified from a jobseeker expression of interest in a job listing. At process block 702 an expression of interest for a job listing is received from a jobseeker. As previously mentioned, the expression of interest can be, for example, an input from a jobseeker indicating that the jobseeker is applying for the job listing or wants to apply for the job listing. Such indication can be provided through a graphical user interface in a website of the listing service provider 116. One or more user interface mechanisms can be utilized to receive an indication from the jobseeker that the jobseeker is applying for the job listing.

In another example, the expression of interest provided by the jobseeker can be an input from the jobseeker to view a job listing. Thus, the jobseeker can input through the jobseeker computing device 102 a request to view more detailed information about a job listing, or view a company profile or recruiter profile information as related to the job listing. In yet another example, the expression of interest received from the jobseeker can be received in the form of jobseeker input indicating previous employment. Employment history can be indicative of an expression of interest in a certain job category or sector because a jobseeker may likely be interested in similar jobs as those jobs that the jobseeker had held in the past. Process 700 continues at process block 704.

At process block 704, jobseeker preferences are updated in an associated jobseeker profile in order to include metadata associated with a job listing. As such, the job listing in which the jobseeker had expressed an interest can be searched in the job listings database 106. Metadata associated with the job listing can be company information such as, the type of employer, salary, location information, etc. Because the jobseeker has expressed an interest in the job listing, the metadata associated with the job listing can be useful and a good indicator of the type of jobs that the jobseeker would like in the future. Therefore, the jobseeker profile can be updated in order to reflect jobseeker preferences according to metadata of job listings of interest. Process 700 continues at process block 706.

At process block 706, a search request that includes search criteria is received from the jobseeker. A search request can be a search request for jobs based on keywords entered by the jobseeker. Process 700 continues at process block 708.

At process block 708, a set of job listings having associated metadata that matches the search criteria and the preference data is identified. As such, the search engine 108 can be configured with logic to search the job listings database 106 in order to identify those job listings that match the search criteria entered by the jobseeker and in addition, that match the jobseeker preferences stored in the jobseeker profile. Therefore, the search engine 108 can be configured to reword, or otherwise manipulate, the search query entered by the jobseeker in order to add to the search query search terms obtained from the jobseeker preferences in order to create a more complete search request. Based on such search requests, the search engine 108 can then locate job listings 106 and identify such job listings as ones that match both the search criteria and the preference data. Process 700 continues at process block 710.

At process block 710, at least the set of job listings identified is provided to the jobseeker. The set of job listings identified by the search engine 108 can be provided to the jobseeker in the form of a list displayed in a web browser as part of a web page. In another embodiment, the set of job listings can be provided to the jobseeker through another application residing at the jobseeker computing device 102. In yet another embodiment, the set of job listings can be provided to the jobseeker through any other user interface.

Figure 8:
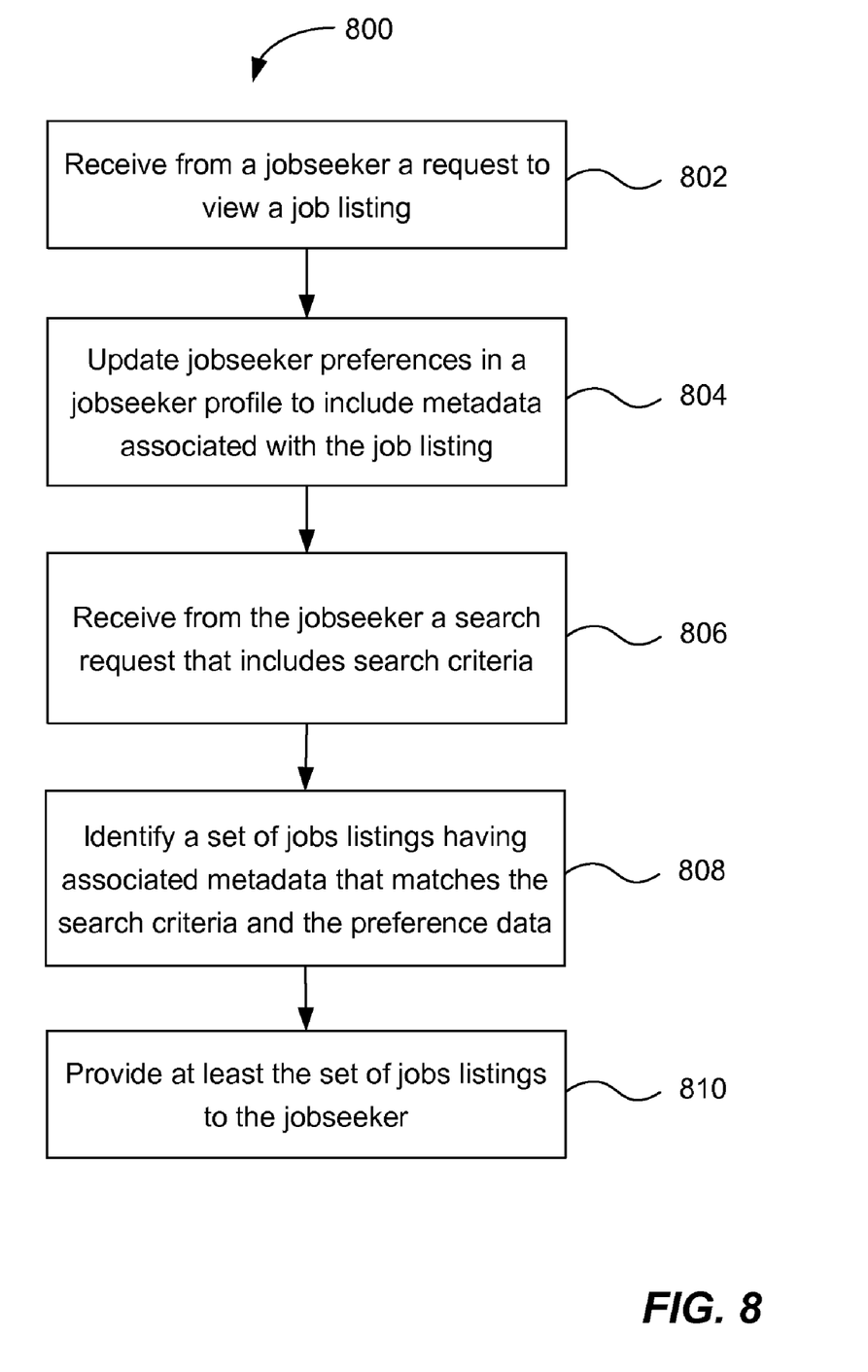
FIG. 8 depicts an exemplary table of job listings according to one embodiment.

FIG. 8 depicts an exemplary table of job listings according to one embodiment. The job listings displayed in table 800 contain partial information of each job listing as one skilled in the art would understand various other aspects or characteristics or attributes can be associated with job listings. The exemplary job listings of table 800 are displayed based on three parameters of metadata associated with each job listing. That is, the job category, company sector and company size can be three parameters that are analyzed in order to determine jobseeker preferences based on job listings that a jobseeker has expressed an interest in.

As such, if a first jobseeker has expressed an interest in job listing 818, 820 and 822, the metadata associated with each of such job listings can be analyzed and stored as part of the first jobseeker's profile. For example, the first jobseeker's profile would indicate that the preferred job category of the jobseeker is Finance because two out of three jobs that the jobseeker had applied for or expressed an interest in have associated metadata that indicates a job category of Finance. In addition, the first jobseeker profile can also be updated as having as the preferred company sector Technology, since the first jobseeker had expressed an interest in two job listings out of three that include metadata in which the company sector is Technology. Likewise, the jobseeker's profile can also be updated to include a preferred company size of 5,000, since the first jobseeker had expressed an interest in two out of three companies that had a size of 5,000 employees.

Figure 9:
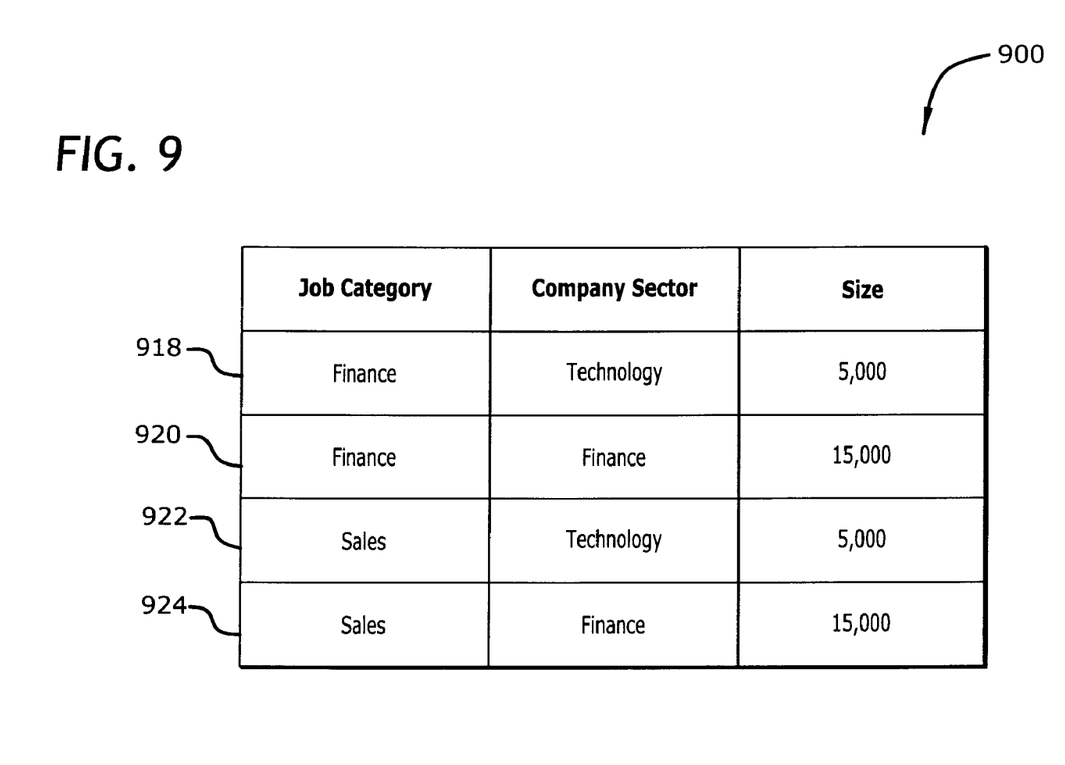
FIG. 9 depicts an exemplary jobseeker profile according to one embodiment.

FIG. 9 depicts an exemplary jobseeker profile according to one embodiment. Jobseeker profile 900 illustrates a jobseeker profile of a first jobseeker who expressed an interest in job listings 818, 820 and 822. As such, attributes 906 for a preferred job category 908 for a preferred company sector 910 for a preferred company size can be populated and dynamically updated according to job listings that the first jobseeker expresses an interest in. As previously mentioned, the first jobseeker can, for example, select two out of three jobs in which the job category is finance and therefore the value 914 can be set to be finance. Likewise, the value 916 can be set to technology and the value 918 can be set to 5,000 employees based on previous job listings that the first jobseeker had expressed an interest in.

Figure 10:
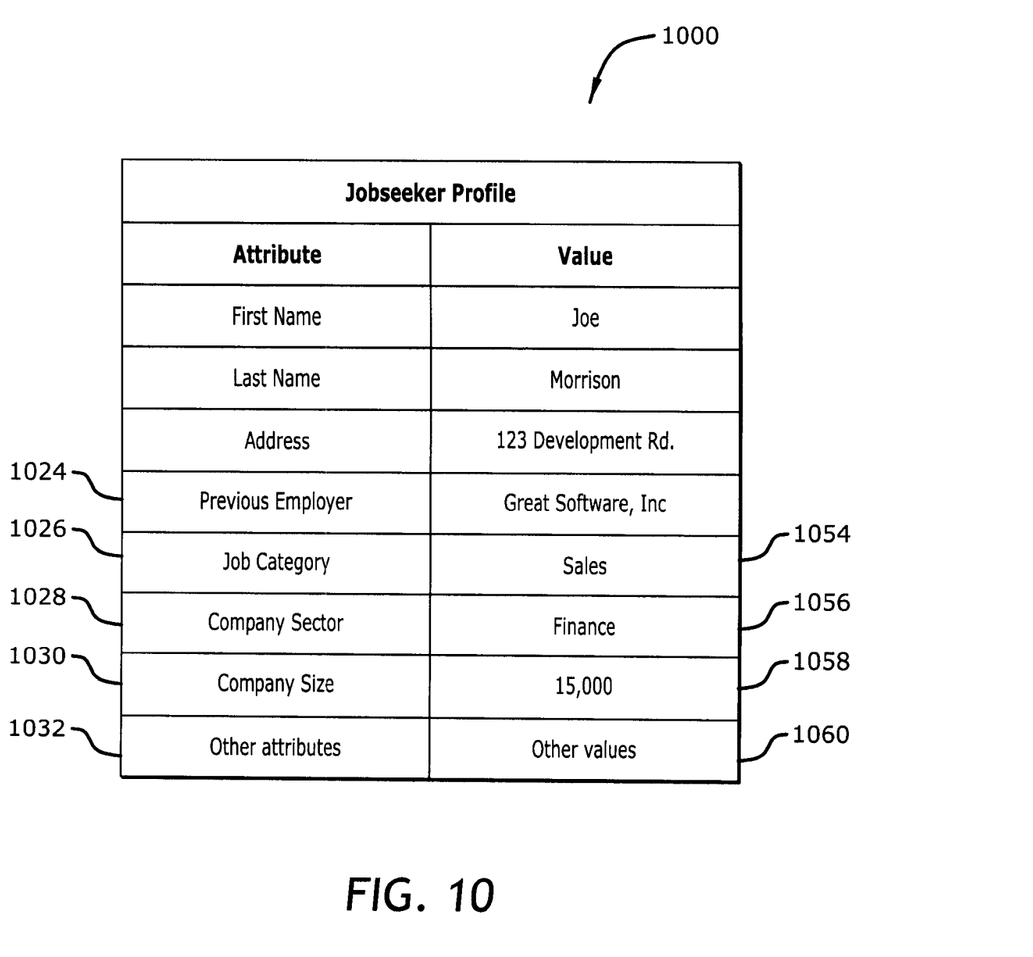
FIG. 10 depicts another exemplary jobseeker profile according to one embodiment.

FIG. 10 depicts another exemplary jobseeker profile according to one embodiment. Jobseeker profile 1000 shows a jobseeker profile of a second jobseeker who expressed an interest in one or more job listings shown table 800. By way of example, the second jobseeker may have expressed an interest in job listing 820, 822 and 824. Based on such expression of interest, the jobseeker profile of the second jobseeker can be updated to include a preferred job category 1026 with a value 1054 set to sales. The value 1054 is set to sales because two out of three job listings that the second jobseeker had expressed an interest in an associated job category of Sales. Likewise, the jobseeker's preferred company sector can be set to Finance. In other words, the value 1056 in the jobseeker profile 1000 can be set to Finance because the second jobseeker had expressed an interest in two out of three job listings that have an associated company sector of Finance.

Likewise, attribute 1030 for preferred company size can be associated with a value 1058 set to 15,000. The value 15,000 for value 1058 can be set based on the second jobseekers expression of interest in two out of three job listings having a company size of 15,000. That is, job listing 820 and job listing 824 both have the company size of 15,000 because the second jobseeker had applied to job listing 820, 822 and 824, two out of those job listings included a company size of 15,000 and therefore value 1058 can be set to 15,000.

Figure 11:
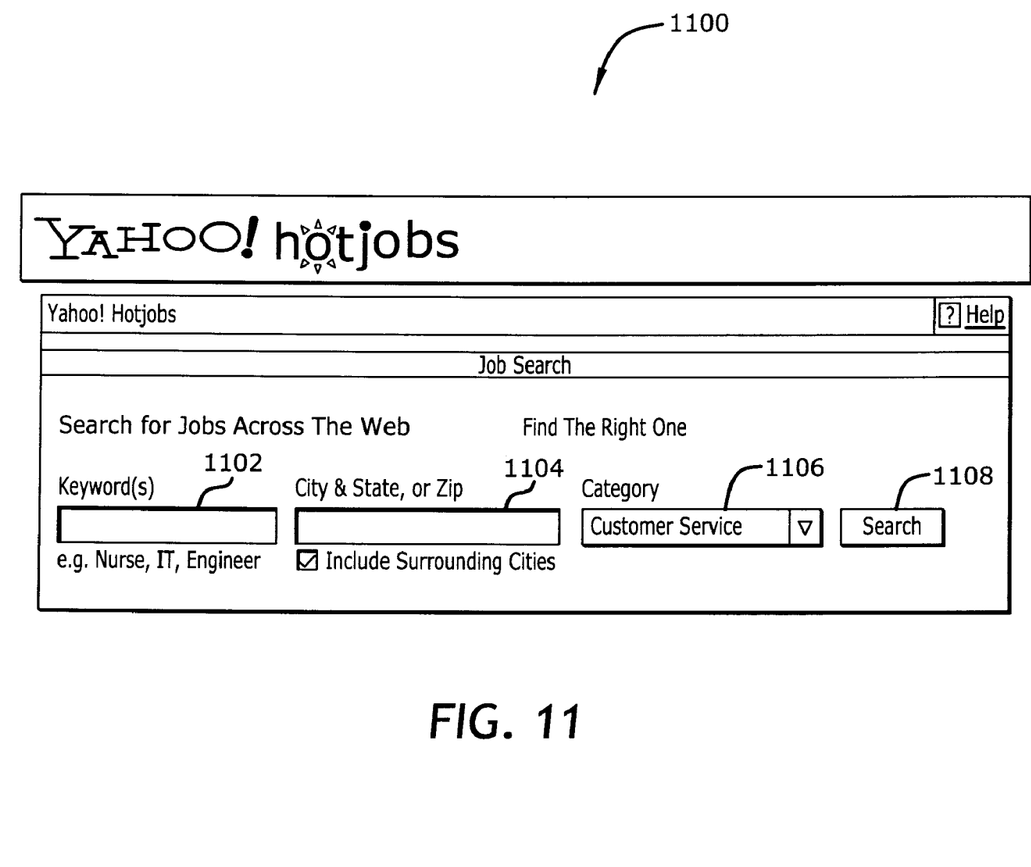
FIG. 11 depicts an exemplary user interface for entering a job search according to one embodiment.

FIG. 11 depicts an exemplary user interface for entering a job search according to one embodiment. User interface 1100 includes text fields 1102 and 1104 that a jobseeker can utilize to enter searching criteria. For example, in text field 1102 a jobseeker can enter certain keywords that can be utilized to locate job listings that have metadata associated with such keywords. In addition, the jobseeker can also enter city, state or zip code as well as selecting whether surrounding cities can be included at text field 1104.

Furthermore, user interface 1100 can also include a drop down menu 1106 that would permit a jobseeker to enter a category of the job listing provided. Examples of categories can include customer service, technology, legal, entertainment, sales, etc. In addition, a search button 1108 can be also provided in order to execute a search.

As previously discussed, a search engine 108 can utilize searched words entered in the job search in order to retrieve job listings from the job listings database 106. Thus, keywords entered into text field 1102, as well as the location entered in 1104, and job industries or categories located in 1106, can be utilized as part of the search of the job listings database 106. If for example the jobseeker enters the keywords "software" and "engineer" in text field 1102, the job listings provided would include any job listing that has as part of the title or metadata associated with the job listing the words engineer and software.

Furthermore, the relevance engine 110 can be configured to search in the jobseeker profiles database 414 to determine implicit and explicit categorizations and preferences of the jobseeker. If for instance the jobseeker has indicated to have a preference for card games, poker, or other games of chance, the relevance engine 110 can search among the job listings in the search results provided by the search engine 108, and refine the search so as to determine if there are any positions for software engineers that further include keywords "poker" or "card game." Therefore, a jobseeker who is interested in card games and poker is likely to enjoy and apply the job listings for software engineer that involves, for example, programming card games applications instead of a software engineering job listing that involves another activity in which the jobseeker is not interested. Therefore, relevant search results are returned to the jobseeker so as to provide a better and more relevant search result to the jobseeker.

In another embodiment, the search engine 108 can utilize user preferences to search for job listings when the jobseeker enters a search. For example, if a jobseeker having an associated jobseeker profile 900 as shown in FIG. 9 enters a search query, the search query can be supplemented by search terms and job listing categories provided via the jobseeker profile. Therefore, the search by the jobseeker can be focused on job listings that have metadata indicative of a "Technology" company sector, approximately "5,000" employees, and that is in the "Finance" category.

In another example, if a jobseeker having an associated jobseeker profile 1000 as shown in FIG. 10 enters a search query, the search query can be supplemented by search terms and job listing categories provided via the jobseeker profile. Therefore, the search by the jobseeker can be focused on job listings that have metadata indicative of a "Finance" company sector, approximately "15,000" employees, and that is in the "Sales" category.

In one embodiment, the jobseeker can be provided with the option to select whether profile data should be taken into account when searching for job listings. As such, using profiling data as part of the jobseeker search can be a feature that the jobseeker can turn on or off.

Of course, as discussed herein, any preference that a jobseekers has expressed, either implicitly or explicitly, can be utilized to further refine the job listing search results.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is:
1. A method comprising:
receiving, by a computing device and from a jobseeker, a search request that includes search criteria;
accessing, by the computing device, a database comprising a plurality of job listings, each job listing having associated metadata;
searching the associated metadata in the database for matches between the search criteria and the associated metadata;
identifying, by the computing device, a set of job listings having associated metadata that match the search criteria;
after the identifying of the set of job listings having the associated metadata that match the search criteria, identifying, by the computing device, preference data related to the jobseeker based on keywords in a previously submitted resume of the jobseeker;

identifying, by the computing device and from the set of job listings, a subset of job listings that match the preference data; and providing, by the computing device, at least the subset of job listings to the jobseeker.

2. The method of claim 1, further comprising storing the preference data as keywords.

3. The method of claim 1, further comprising storing the preference data as scores for multiple categories.

4. The method of claim 1, further comprising determining the preference data from explicit jobseeker input.

5. The method of claim 1, further comprising determining the preference data from implicit jobseeker input.

6. A method comprising:

receiving, by a computing device and from a jobseeker, a search request that includes search criteria;

accessing, by the computing device, a database comprising a plurality of job listings, each job listing having associated metadata;

searching the associated metadata in the database for matches between the search criteria and the associated metadata;

identifying, by the computing device, a set of job listings having associated metadata that matches the search criteria;

after the identifying of the set of job listings having the associated metadata that matches the search criteria, identifying, by the computing device, preference data of the jobseeker based on keywords in a previously submitted search by the jobseeker;

identifying, by the computing device and from the set of job listings, a subset of job listings that match the preference data; and providing, by the computing device, the subset of job listings to the jobseeker.

7. The method of claim 6, further comprising storing the preference data as keywords.

8. The method of claim 6, further comprising storing the preference data as scores for multiple categories.

9. The method of claim 6, further comprising determining the preference data from explicit jobseeker input.

10. The method of claim 6, further comprising determining the preference data from implicit jobseeker input.

11. A system comprising:

a search engine that receives from a jobseeker a search request that includes search criteria, the search engine accessing a database comprising a plurality of job listings, each job listing having associated metadata, the search engine searching the associated metadata in the database for matches between the search criteria and the associated metadata and identifying a set of jobs listings that have associated metadata that matches the search criteria;

a preference data collection module executing on a computing device, the preference data collection module identifying, after the identifying of the set of job listings having the associated metadata that matches the search criteria, implicit preference data of the jobseeker based on keywords in a previously submitted search by the jobseeker; and a relevance engine executing on the computing device, the relevance engine identifying, from the set of job listings, a subset of job listings that match the preference data, the subset of job listings being provided to the jobseeker.

12. The system of claim 11, wherein the preference data is stored as keywords.

13. The system of claim 11, wherein the preference data is stored as scores for multiple categories.

14. The system of claim 11, wherein the preference data is determined from explicit jobseeker input.

15. The system of claim 11, wherein the preference data is determined from implicit jobseeker input.

16. A method comprising:

receiving, by a computing device and from a jobseeker, an expression of interest in a job listing;

updating, by the computing device, jobseeker preference data in a jobseeker profile to include metadata associated with the job listing;

receiving, by the computing device and from the jobseeker, a search request that includes search criteria;

accessing, by the computing device, a database comprising a plurality of job listings, each job listing having associated metadata;

searching the associated metadata in the database for matches between the search criteria and the associated metadata;

identifying, by the computing device, a set of job listings having associated metadata that matches the search criteria;

after the identifying of the set of job listings having the associated metadata that matches the search criteria, identifying, by the computing device, preference data of the jobseeker based on keywords in a previously submitted search by the jobseeker;

identifying, by the computing device and from the set of job listings, a subset of job listings that match the preference data; and providing, by the computing device, at least the subset of job listings to the jobseeker.

17. The method of claim 16, wherein receiving from a jobseeker an expression of interest in a job listing comprises receiving an input indicating that the jobseeker wishes to apply for the job listing.

18. The method of claim 16, wherein receiving from a jobseeker an expression of interest in a job listing comprises receiving an input indicative that the jobseeker wants to view the job listing.

19. The method of claim 16, wherein receiving from a jobseeker an expression of interest in a job listing comprises receiving an input indicative of a previous employment position held by the jobseeker that is similar to the job listing.

20. The method of claim 16, wherein the metadata associated with the job listing includes profile of the recruiter that posted the job listing.

21. A system comprising:

a preference data collection module executing on a computing device, the preference data collection module configured to receive from a jobseeker an expression of interest in a job listing, the preference data collection module further configured to update jobseeker preferences in a jobseeker profile to include metadata associated with the job listing; and a search engine configured to receive from the jobseeker a search request that includes search criteria, the search engine further configured to access a database comprising a plurality of job listings, each job listing having associated metadata and search the associated metadata in the database for matches between the search criteria and the associated metadata, the search engine further configured to identify a set of jobs listings having associated metadata that matches the search criteria and the jobseeker preferences, the search engine further configured to provide at least the set of jobs listings to the jobseeker.

22. The system of claim 21, wherein the expression of interest in the job listing is an input indicating that the jobseeker wishes to apply for the job listing.

23. The system of claim 21, wherein the expression of interest in the job listing is an input indicative that the jobseeker wants to view the job listing.

24. The system of claim 21, wherein the expression of interest in the job listing is an input indicative of a previous employment position held by the jobseeker that is similar to the job listing.

25. The system of claim 21, wherein the metadata associated with the job listing includes profile of the recruiter that posted the job listing.

* * * * *